Oct. 29, 1963   L. S. BARTLEY   3,108,505
WIRE STRIPPING TOOL
Filed Oct. 14, 1960
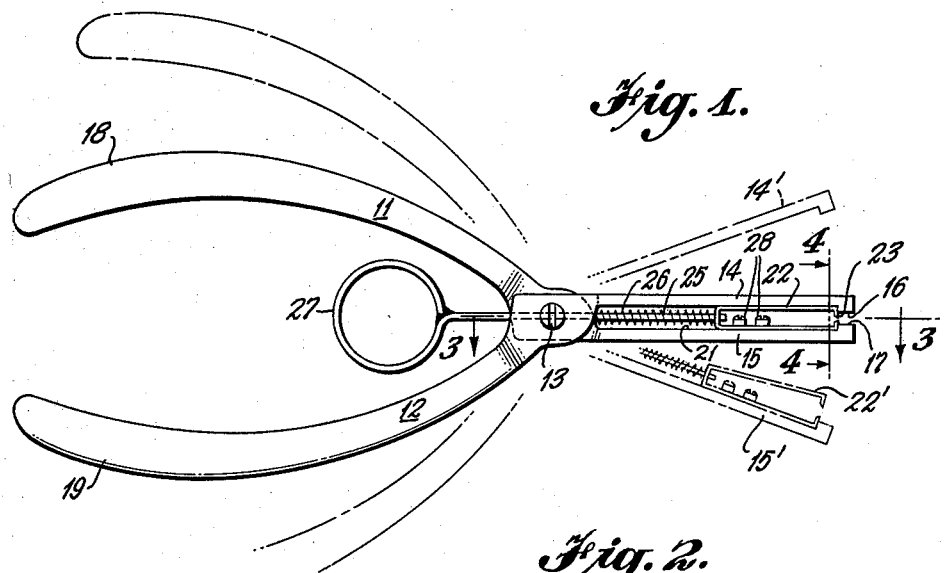
Fig. 1.
Fig. 2.
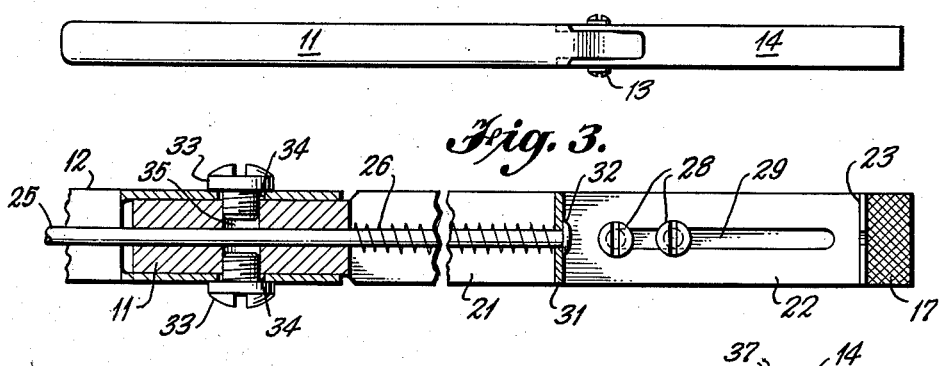
Fig. 3.
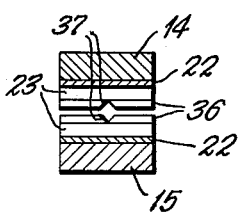
Fig. 4.
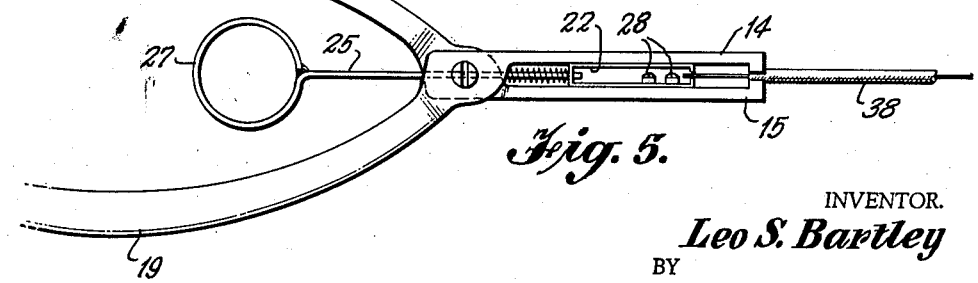
Fig. 5.
INVENTOR.
*Leo S. Bartley*
BY
*Porter, Chittick, Russell & Pfund*
ATTORNEYS United States Patent Office 3,108,505
Patented Oct. 29, 1963

3,108,505
WIRE STRIPPING TOOL
Leo S. Bartley, Rome, N.Y., assignor to Bartley Manufacturing Company, Incorporated, Alamogordo, N. Mex., a corporation of New Mexico
Filed Oct. 14, 1960, Ser. No. 62,702
9 Claims. (Cl. 81—9.5)

This invention relates generally to a wire stripping tool and more particularly to an extremely simple tool having characteristics similar to those of an ordinary radio type pliers suitable for economical manufacture and convenient use.

Wire stripping tools of two general types have been provided in the prior art one of which, exemplified by the patent to Montgomery, 1,730,980, has come into widespread use throughout the radio and electronics industry. The wire strippers of the aforementioned type are characterized by an instrument generally resembling a pair of pliers with gripping jaws and cutting jaws which are transverse to the movable portion of the plier assembly. While this type wire stripper is in widespread use where unlimited space is available for performing the operation, the tool is generally so cumbersome, in that its operation requires substantial movement of relatively massive members, that it is useless in many situations which require wire to be stripped in assembling electronic equipment.

A further type wire stripper has been provided by the prior art as exemplified by the patents to Holt 2,601,797, Chamberlin 2,724,985, and Green 2,735,320. Wire stripping tools in accordance with these prior patents generally provide gripping jaws and cutting and stripping jaws arranged for relative motion axially of the wire to be stripped. While the tools of this type potentially offer distinct advantages over the transverse type wire stripper previously mentioned especially where wire stripping operations are to be carried out in confined spaces, the structural arrangements of the prior art axial wire strippers have been so complex that tools of this type have not come into general use.

It is accordingly the primary object of the present invention to provide an extremely simple axially oriented wire stripping tool which is simple and efficient to operate and extremely economical to manufacture.

A further object of the invention is to provide a wire stripping tool having a minimum of moving parts.

A further object of the invention is to provide a wire stripping tool in the form of a conventional radio type pliers the operation of which will be apparent to electronic technicians and provide complete control of the steps of the wire stripping operation in a single handed manipulation.

These and other objects of the invention will be apparent from the following detailed description taken in conjunction with the accompanying drawing wherein:

FIG. 1 is a side elevation view of a wire stripping pliers constructed in accordance with the invention;

FIG. 2 is a top plan view of the wire stripping pliers of FIG. 1;

FIG. 3 is a partial sectional view taken along the line 3—3 of FIG. 1;

FIG. 4 is a sectional view taken along the line 4—4 of FIG. 1; and

FIG. 5 is a view similar to FIG. 1 showing a wire being stripped.

Referring now to FIG. 1, the construction of the wire stripping tool of the present invention provides a configuration generally similar to a radio type pliers. This structure includes a pair of plier type members 11, 12, which fit together to provide a pliers-type pivot 13. On one side of the pivot 13, elongated jaws 14, 15, extend and terminate in gripping surfaces 16, 17. On the opposite side of the pivot 13, the members 11 and 12 are formed into gripping handles 18, 19.

The elongated jaw 15 has secured along an inside surface area 21 thereof, a spring steel U-shaped member 22. The U-shaped member 22 generally conforms with the shape of the interior surfaces of the jaws 14 and 15 and terminates adjacent gripping surfaces 16, 17 in cutting edges 23. The U-shaped member has an undeflected normal shape indicated at 22' which it assumes due to its spring action whenever the jaws 14, 15 are opened by operation of the pliers to correspond to displaced positions 14', 15'. This spring action of the member 22 provides a small spring force to maintain the jaws 14, 15 slightly displaced in the normal operation of the tool while permitting closure of the gripping surfaces 16, 17 and the edges 23 upon the application of sufficient force to the handles 18, 19 to overcome the spring force of the member 22.

The U-shaped member 22 is connected to a rod 24 which slidably passes through the pivot point 13 in the plier member 11. The U-member 22 is maintained with the jaws 23 in engagement with the edge of gripping surfaces 16, 17 by compression of spring 26 which bears against the U-member 22 and the inner portion of plier member 11. The rod 25 terminates in a finger-ring 27 positioned between the plier members 11, 12.

The plan view of FIG. 2 shows the tool constructed in accordance with the present invention to have the same general construction in appearance and physical outline as a radio-type pliers.

Referring to FIG. 3, the construction features of the gripping edges 23 and the cutting and stripping member 22 are shown in detail. The U-shaped member 22 is secured to the surface 21 of the jaw 15 by conventional headed fasteners 28 passing through an elongated slot 29 in the member 22. The rod 25 is fastened to a bottom portion 31 of the U-member 22 through which it projects and is swaged at 32 thereby securing the rod to the U-shaped member 22. The rod 25 projects through pivot axis 13 and for this purpose the structure which provides pivotal operation must be suitably modified. A particular form of pivot connection is shown in FIG. 3 to comprise short threaded screws 33 which pass freely through holes 34 in the mating portion of the pliers 12 and engaged threads in the portion of the pliers 11. The screws 33 terminate short of the rod 25 thereby providing an opening 35 through the pivot axis formed by the body of the screws 33 through which the rod 25 projects. The portion of the pliers 11 in the vicinity of the pivot is formed with an axial hole for receiving the rod 25, and, if desired, this hole may be keyed or otherwise suitably shaped to receive the rod 25 in a predetermined rotative alignment for the purpose of keeping the finger-ring 27 aligned in the plane of the handles 18, 19. While a particular form of pivotal connection of the plier members 11, 12 is shown in FIG. 3, it will be understood that any conventional pivot as employed in the construction of pliers 11 will be suitable in the present invention if modified to provide an axial hole through which the rod 25 can pass.

The details of the cutting and stripping edges 23 are shown in FIG. 4. The cutting edges 23 are formed as projections from the U-shaped member 22 and terminate in sharpened edges 36 having a centrally located notch 37 therein. The notches 37 are in opposed position to form an opening through which the copper conductor of the wire to be stripped may pass when the edges 36 close to sever the insulation material surrounding the conductor. The sides of the opening formed by the notches 37 when the edges 36 are closed against each other may be selected to correspond with the size of the conductor in the wire to be stripped thereby avoiding any physical damage to the copper conductor itself.

Referring now to FIG. 5, the operation of the tool as it is used to strip insulation from a conductor is shown. The tool is opened and applied to engage a wire 38 to be stripped by aligning the tool generally axially with the wire 38. The handles 18, 19 are then closed by a squeezing grip in one hand of the operator to close the jaws 14, 15 thereby permitting the gripping surfaces 16, 17 to engage the insulation on the wire 38. At this time the U-shaped member 22 will have jaws 23 abutting the projections which form gripping surfaces 16 and 17 (as shown in FIG. 1) so that as the jaws 14, 15 are depressed the U-shaped member 22 is closed on the wire 38 and the cutting edges 36 pierce the insulation on the wire. With the wire 38 properly centered in the gripping jaws 16, 17 the insulation is cut substantially free at the position of the cutting edges 36 and the conductor of the wire 38 passes through the opening formed by the notches 37 thereby avoiding physical damage to the conductor. The foregoing operation is completed in one simple continuous motion corresponding generally with the gripping of a wire by means of a plier type instrument. As soon as the wire 38 is gripped by the wire stripping tool of the present invention as just described, a finger of the operator, on the same hand employed to hold the tool, may be inserted in the ring 27 to axially draw the cutting member 22 away from the gripping surfaces 16, 17. Since the insulation has been severed by the gripping of the wires 38, the axial force imparted to the rod 25 by means of a finger in finger ring 27 readily strips the cut end of insulation from the conductor of the wire 38 thereby completing the stripping operation. Since the gripping, cutting, and stripping operations are completely under the control of the operator the entire sequence can be performed with any required degree of care, and since the tool is of relatively small transverse dimensions a successful wire stripping operation can be performed in relatively inaccessible locations. At the end of the stripping operation the finger-ring 27 can be maintained in its displaced position to prevent the return of the cutting jaws 23 from bending the exposed conductor of the wire 38.

While a particular embodiment of the present invention has been disclosed, it will be apparent that many constructional features thereof may be modified without departing from the present teaching. Such modifications are to be considered as within the scope of the present invention which is limited only by the appended claims.

I claim:

1. A wire stripping tool comprising a pair of relatively straight elongated members pivotally connected intermediate their ends to form a pliers having spaced handles on one side of the pivot connection and long narrow jaw extensions on the other side of said pivot connection terminating in opposed gripping jaws, a U-shaped spring having the ends thereof formed into opposed cutting edges, means for securing said spring for sliding motion along the inner surface of one of said extensions between a first position where said cutting edges abut said gripping jaws and a second position where said cutting edges are displaced toward said pivot connection, a rod secured at one end to the base of said U-shaped spring and projecting through said pivot connection, a finger-ring formed on the end of said rod between said handles, and spring means for urging said U-shaped spring to said first position.

2. Apparatus according to claim 1 in which said cutting edges are formed as transverse extensions at the open ends of said spring and notched to form an opening through said edges when said edges are engaged, and the sum of the lengths of said transverse extensions is equal to the spacing between the opposed inner surfaces of said jaw extensions when said jaws have a predetermined spacing therebetween which is slightly less than the diameter of the insulated wire being stripped.

3. Apparatus according to claim 1 in which said U-shaped spring is a leaf spring having an elongated slot in one side, and a pair of spaced headed fasteners project through said slot into said extension for slidably securing said leaf spring to said extension.

4. A wire stripping tool comprising a pliers having a transversely apertured pivot pin joining two members which form spaced handles on one side of said pivot pin and extensions terminating in opposed jaws on the opposite side of said pivot pin, a U-shaped spring member having dimensions generally corresponding to the space between said extensions and a normal shape which urges said jaws into a spaced position, means for slidably fastening one side of said spring to the inner surface of one of said extensions, a pair of opposed cutting edges on the ends of said U-shaped spring member adjacent the inner edges of said jaws, a rod connected to the base of said spring member and extending through the aperture in said pivot pin, and a finger grip on the end of said rod between said handles for withdrawing said U-shaped member from the position where said cutting edges are adjacent said jaws.

5. A wire stripping pliers having pivot connected members forming handles and extensions with gripping jaws substantially symetrically arranged relative to a stripping axis which coincides with the longitudinal axis of the wire to be stripped, a rod substantially parallel with said stripping axis extending between said extensions and said handles and positioned for independent slidable operation through the region of said pivot, a finger-ring for operating said rod on one end thereof between said handles, and a cutting and stripping means mounted between said extensions and secured to the other end of said rod for slidable motion therewith along said stripping axis independent of the gripping force applied to said wire by said jaws.

6. Apparatus according to claim 5 in which said cutting and stripping means comprises cutting and stripping jaws adjacent said gripping jaws with spring means for normally maintaining said cutting and stripping jaws open and adapted to be closed by the closure of said gripping jaws.

7. Apparatus according to claim 6 in which said cutting and stripping jaws are formed at the ends of a U-shaped leaf spring having an elongated slot in one side thereof, a headed fastener passing through said slot into one of said extensions, and a connection at the base of said U-shaped spring to said rod.

8. Apparatus according to claim 7 and including a coil spring on said rod between said pivot and said base urging said cutting and stripping jaws against said gripping jaws.

9. A wire stripping pliers having pivot connected members forming handles and extensions with gripping jaws substantially symmetrically arranged relative to a stripping axis which coincides with the longitudinal axis of the wire to be stripped, a rod substantially parallel with said stripping axis extending between said extensions and said handles and positioned for independent slidable operation through the region of said pivot, a finger ring for operating said rod on one end thereof between said handles, a U-shaped spring cutting member mounted on the other end of said rod for axial movement therewith between said extensions independent of the gripping force applied to said wire by said jaws, said U-shaped spring cutting member having transverse dimensions generally corresponding to the width of said extensions and an undeflected shape which urges said jaws into a spaced position, and means for slidably retaining said cutting member between the inner surfaces of said extensions in order to permit slidable operation of said cutting member along said stripping axis between said extensions independent of the operation of said handles.

References Cited in the file of this patent

UNITED STATES PATENTS

| | | |
|---|---|---|
| 2,601,797 | Holt | July 1, 1952 |
| 2,724,985 | Chamberlin | Nov. 29, 1955 |
| 2,735,320 | Green | Feb. 21, 1956 |
| 2,765,684 | Reck | Oct. 9, 1956 |
| 2,995,051 | Redway | Aug. 8, 1961 |

FOREIGN PATENTS

| | | |
|---|---|---|
| 780,257 | France | Jan. 29, 1935 |